United States Patent
Ma et al.

(10) Patent No.: US 9,130,271 B2
(45) Date of Patent: Sep. 8, 2015

(54) APPARATUS AND METHOD FOR AN ACTIVE ANTENNA SYSTEM WITH NEAR-FIELD RADIO FREQUENCY PROBES

(71) Applicant: FutureWei Technologies, Inc., Plano, TX (US)

(72) Inventors: Zhengxiang Ma, Summit, NJ (US); Leonard Piazzi, Denville, NJ (US); Alexis Pierides, Piscataway, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 311 days.

(21) Appl. No.: 13/775,002

(22) Filed: Feb. 22, 2013

(65) Prior Publication Data

US 2013/0234883 A1 Sep. 12, 2013

Related U.S. Application Data

(60) Provisional application No. 61/603,086, filed on Feb. 24, 2012, provisional application No. 61/603,107, filed on Feb. 24, 2012, provisional application No. 61/603,122, filed on Feb. 24, 2012, provisional application No. 61/603,132, filed on Feb. 24, 2012.

(51) Int. Cl.
*G01S 7/40* (2006.01)
*G01S 7/28* (2006.01)
*H01Q 3/26* (2006.01)
(Continued)

(52) U.S. Cl.
CPC .............. *H01Q 3/267* (2013.01); *G01S 7/023* (2013.01); *G01S 7/2813* (2013.01); *G01S 7/40* (2013.01); *G01S 7/4008* (2013.01); *G01S 7/4017* (2013.01); *G01S 7/4021* (2013.01); *H01Q 1/246* (2013.01); *H01Q 19/106* (2013.01); *H01Q 23/00* (2013.01)

(58) Field of Classification Search
CPC .................... G01S 7/40–7/4056; H01Q 3/267; H01Q 19/106; H01Q 1/2146; H01Q 23/00
USPC .................................................. 342/165–174
See application file for complete search history.

(56) References Cited

U.S. PATENT DOCUMENTS 2,861,177 A * 11/1958 Dishal et al. .................. 455/502
4,949,090 A * 8/1990 Tamii et al. .................... 342/173
(Continued)

FOREIGN PATENT DOCUMENTS

CN 1553717 A 12/2004
CN 101032053 A 9/2007
(Continued)

OTHER PUBLICATIONS

Thomas, T., et al., "Experimental MIMO Comparisons of a 4-Element Uniform Linear Array to an Array of Two Cross Polarized Antennas at 3.5 GHz," IEEE 70th Vehicular Technology Conference Fall, Sep. 20-23, 2009, 5 pages.

*Primary Examiner* — Peter Bythrow
(74) *Attorney, Agent, or Firm* — Slater & Matsil, L.L.P.

(57) ABSTRACT

Field-serviceable radio frequency modules can be achieved by replacing hard-wired radio frequency (RF) feedback paths with external near-field RF probes. Notably, the near-field RF probes may allow for the RF module to be installed/re-installed on a backplane or other support structure without fowling factory calibration settings. Multiple near-field RF probes can monitor a single RF module. Additionally, a single near-field RF probe can monitor multiple RF modules.

19 Claims, 14 Drawing Sheets

(51) Int. Cl.
*G01S 7/02* (2006.01)
*H01Q 1/24* (2006.01)
*H01Q 19/10* (2006.01)
*H01Q 23/00* (2006.01)

(56) References Cited

U.S. PATENT DOCUMENTS

| | | | |
|---|---|---|---|
| 4,994,813 A * | 2/1991 | Shiramatsu et al. | 342/360 |
| 5,187,486 A * | 2/1993 | Kolzer | 342/360 |
| 5,294,934 A * | 3/1994 | Matsumoto | 342/173 |
| 5,477,229 A * | 12/1995 | Caille et al. | 342/360 |
| 5,530,449 A * | 6/1996 | Wachs et al. | 342/174 |
| 5,559,519 A * | 9/1996 | Fenner | 342/174 |
| 5,677,696 A * | 10/1997 | Silverstein et al. | 342/360 |
| 5,861,843 A * | 1/1999 | Sorace et al. | 342/372 |
| 5,929,809 A * | 7/1999 | Erlick et al. | 342/372 |
| 5,969,689 A | 10/1999 | Martek et al. | |
| 6,046,697 A * | 4/2000 | Overbury et al. | 342/360 |
| 6,127,966 A * | 10/2000 | Erhage | 342/174 |
| 6,134,422 A | 10/2000 | Bobadilla et al. | |
| 6,140,972 A | 10/2000 | Johnston et al. | |
| 6,163,296 A * | 12/2000 | Lier et al. | 342/417 |
| 6,188,373 B1 | 2/2001 | Martek | |
| 6,356,233 B1 * | 3/2002 | Miller et al. | 342/368 |
| 6,384,781 B1 * | 5/2002 | Kautz et al. | 342/368 |
| 6,507,315 B2 * | 1/2003 | Purdy et al. | 342/374 |
| 6,999,042 B2 | 2/2006 | Dearnley et al. | |
| 7,136,017 B2 | 11/2006 | Condon et al. | |
| 7,199,753 B2 * | 4/2007 | Pauplis | 342/368 |
| 7,215,298 B1 * | 5/2007 | Fraschilla et al. | 343/853 |
| 7,868,843 B2 | 1/2011 | Borau et al. | |
| 7,876,276 B1 * | 1/2011 | Zaman et al. | 343/703 |
| 7,916,082 B1 * | 3/2011 | Herting | 342/368 |
| 8,686,909 B2 | 4/2014 | Frank et al. | |
| 2002/0171583 A1 * | 11/2002 | Purdy et al. | 342/368 |
| 2003/0032424 A1 | 2/2003 | Judd et al. | |
| 2003/0038746 A1 * | 2/2003 | Patel et al. | 342/368 |
| 2003/0038747 A1 * | 2/2003 | Patel et al. | 342/368 |
| 2003/0117315 A1 * | 6/2003 | Graham | 342/174 |
| 2004/0061644 A1 * | 4/2004 | Lier et al. | 342/368 |
| 2006/0071859 A1 | 4/2006 | Condon et al. | |
| 2006/0192710 A1 * | 8/2006 | Schieblich | 342/368 |
| 2006/0284768 A1 * | 12/2006 | Pauplis | 342/368 |
| 2007/0007898 A1 | 1/2007 | Bruning | |
| 2007/0210959 A1 | 9/2007 | Herd et al. | |
| 2007/0241978 A1 | 10/2007 | Cheng | |
| 2008/0129613 A1 * | 6/2008 | Ermutlu et al. | 343/703 |
| 2009/0153394 A1 * | 6/2009 | Navarro et al. | 342/174 |
| 2011/0032158 A1 | 2/2011 | Rodger et al. | |
| 2011/0133982 A1 * | 6/2011 | Goshen et al. | 342/174 |
| 2011/0260944 A1 | 10/2011 | Ferris | |
| 2012/0028587 A1 * | 2/2012 | Ferguson et al. | 455/67.14 |
| 2012/0206291 A1 * | 8/2012 | Schuman et al. | 342/174 |
| 2013/0120199 A1 | 5/2013 | Frank et al. | |
| 2013/0222201 A1 | 8/2013 | Ma et al. | |
| 2013/0225222 A1 | 8/2013 | Ma et al. | |

FOREIGN PATENT DOCUMENTS

| | | |
|---|---|---|
| CN | 101904051 A | 12/2010 |
| CN | 102035061 A | 4/2011 |
| CN | 102347532 A | 2/2012 |
| EP | 2173005 A1 | 4/2010 |
| KR | 20100109761 | 10/2011 |

* cited by examiner ize_large# APPARATUS AND METHOD FOR AN ACTIVE ANTENNA SYSTEM WITH NEAR-FIELD RADIO FREQUENCY PROBES This application claims the benefit of U.S. Provisional Application No. 61/603,086 entitled "Apparatus and Method for an Active Antenna System with RF Probes," U.S. Provisional Application No. 61/603,107 entitled "Apparatus and Method for a Modular Multi-Sector Active Antenna System for a Multi-Sector Small Cell Application," U.S. Provisional Application No. 61/603,122 entitled "Apparatus and Method for an Active Antenna System with a Heat Sinking Reflector," and U.S. Provisional Application No. 61/603,132 entitled "Apparatus and Method for a Modular Multi-Sector Active Antenna System," each of which were filed on Feb. 24, 2012 and are incorporated by reference herein as if reproduced in their entireties.

TECHNICAL FIELD

The present invention relates to an apparatus and method for wireless communications, and, in particular embodiments, to an apparatus and method for an active antenna system with near-field radio frequency (RF) probes.

BACKGROUND

Modern wireless networks use active antenna systems (AASs) to achieve increased performance on the wireless link. Active antennas are presently used in macro base stations (BSs), and it is foreseeable that active antennas will be deployed as small cell wireless transceivers in the near future. Accordingly, there is potentially significant market demand for compact, modular AAS designs that are cost effective, durable, and capable of being reliably installed and serviced in remote field locations.

SUMMARY

Technical advantages are generally achieved, by embodiments of this disclosure which describe an apparatus and method for an active antenna system with near-field RF probes.

In accordance with an embodiment, aspects of this disclosure provide an active antenna device comprising a path, a radiating element, and a radio frequency (RF) probe positioned near the radiating element. In this example, the RF probe is configured to wirelessly communicate a calibration signal with the radiating element, and the calibration signal is processed to calibrate a phase or gain parameter of the path.

In accordance with another embodiment, aspects of this disclosure provide a structure for antenna devices. In this example, the structure includes a backplane structure, one or more mounting configurations for mounting radio frequency (RF) modules to the backplane structure, and at least one near-field RF probe affixed to the backplane structure. In this example, the at least one near-field RF probe is configured to communicate calibration signals with RF modules mounted to the backplane structure.

In accordance with yet another embodiment, aspects of this disclosure provide a modular active antenna system (AAS) comprising a backplane, an array of independent radio frequency (RF) modules mounted to the backplane, a calibration module, and a plurality of near-field RF probes coupled to the calibration module via a plurality of RF connections.

In accordance with yet another embodiment, aspects of this disclosure provide a communications method. In this example, the method includes wirelessly communicating a calibration signal between a near-field radio frequency (RF) probe and a radiating element. The calibration signal is processed to calibrate a phase or gain parameter of a path.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Due to manufacturing variations and other factors, it may be desirable (or even necessary) to continuously calibrate antenna elements in active antennas to ensure that the amplitude/phase of beamformed signals are properly aligned. Continuous antenna element calibration may conventionally be achieved via a hardwired feedback path (e.g., as illustrated below in FIG. 3), which serves to insert and pick up calibration signals. Notably, the hardwired feedback path is an RF connection whose characteristics heavily influence the calibration readings, and, as a result, active antennas are typically calibrated at the factory based on various characteristics (impedance, etc.) of the RF connection. This factory calibration is usually reliable so long as the RF connection remains undisturbed, e.g., is not broken/remade. Hence, while hardwired feedback calibration paths are fairly reliable in non-modular AASs (e.g., as shown in FIG. 2), they may be unsuitable for modular AASs, where field-servicing of the RF module components (e.g., installation on a backplane) may disturb the RF connections. Accordingly, a feedback calibration design that remains reliable during field-servicing of modular AASs is desired.

Aspects of this disclosure provide reliable calibration feedback in modular AASs via near-field radio frequency (RF) probes which are affixed to the backplane such that individual RF modules may be field-serviced (e.g., installed) without disturbing the RF connection. Near-field RF probes may include a means to couple electromagnetic energy to a radiating element. In some embodiments, the qualifying RF probes as "near-field" RF probes implies that the distance between the probe and the radiating element is less than one wavelength of the radiated signal. Near-field RF probes may be further discussed in the Institute of Electrical and Electronics Engineers (IEEE) article Vehicular Technology Conference Fall (VTC 2009-Fall), 2009 IEEE 70th Digital Object Identifier: 10.1109/VETECF.2009.5378996, which is incorporated by reference herein as if reproduced in its entirety.

Figure 1:
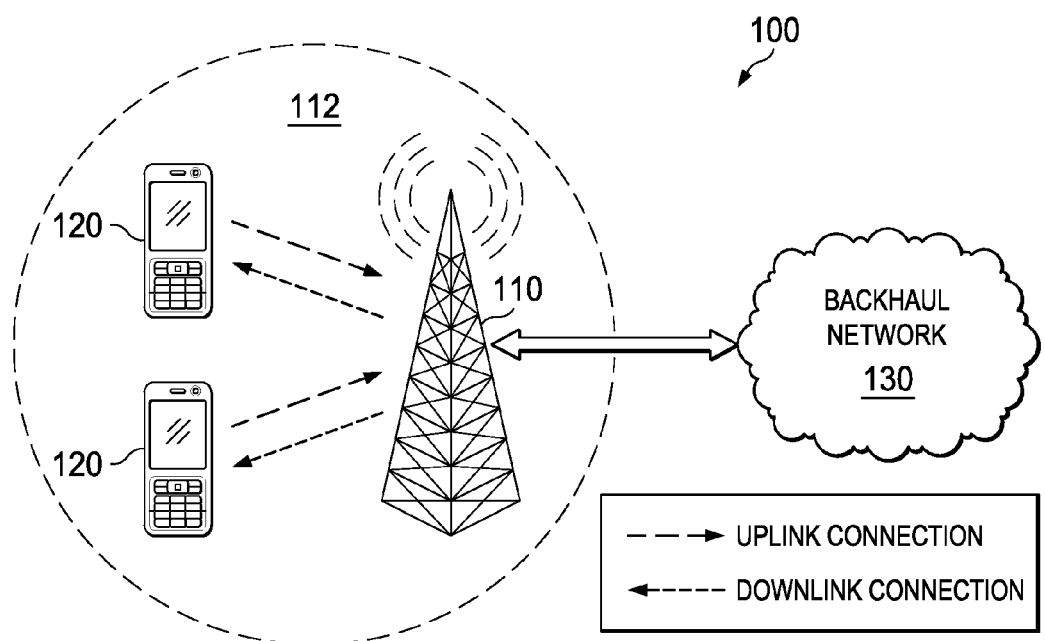
FIG. 1 illustrates a diagram of a wireless network for communicating data.

FIG. 1 illustrates a network 100 for communicating data. The network 100 comprises an access point (AP) 110 having a coverage area 112, a plurality of user equipments (UEs) 120, and a backhaul network 130. The AP 110 may include a modular AAS that is capable of providing wireless access by, inter alia, establishing uplink (dashed line) and/or downlink (dotted line) connections with the UEs 120. The AP 110 may be a macro base station, an enhanced base station (eNB), a pico base station, a micro base station, a femtocell, or any other device configured to provide wireless access to wirelessly enabled devices. The UEs 120 may comprise any component capable of establishing a wireless connection with the AP 110. The backhaul network 130 may be any component or collection of components that allow data to be exchanged between the AP 110 and a remote end (not shown). In some embodiments, the network 100 may comprise various other wireless devices, such as relays, femtocells, etc.

Figures 2A, 2B:
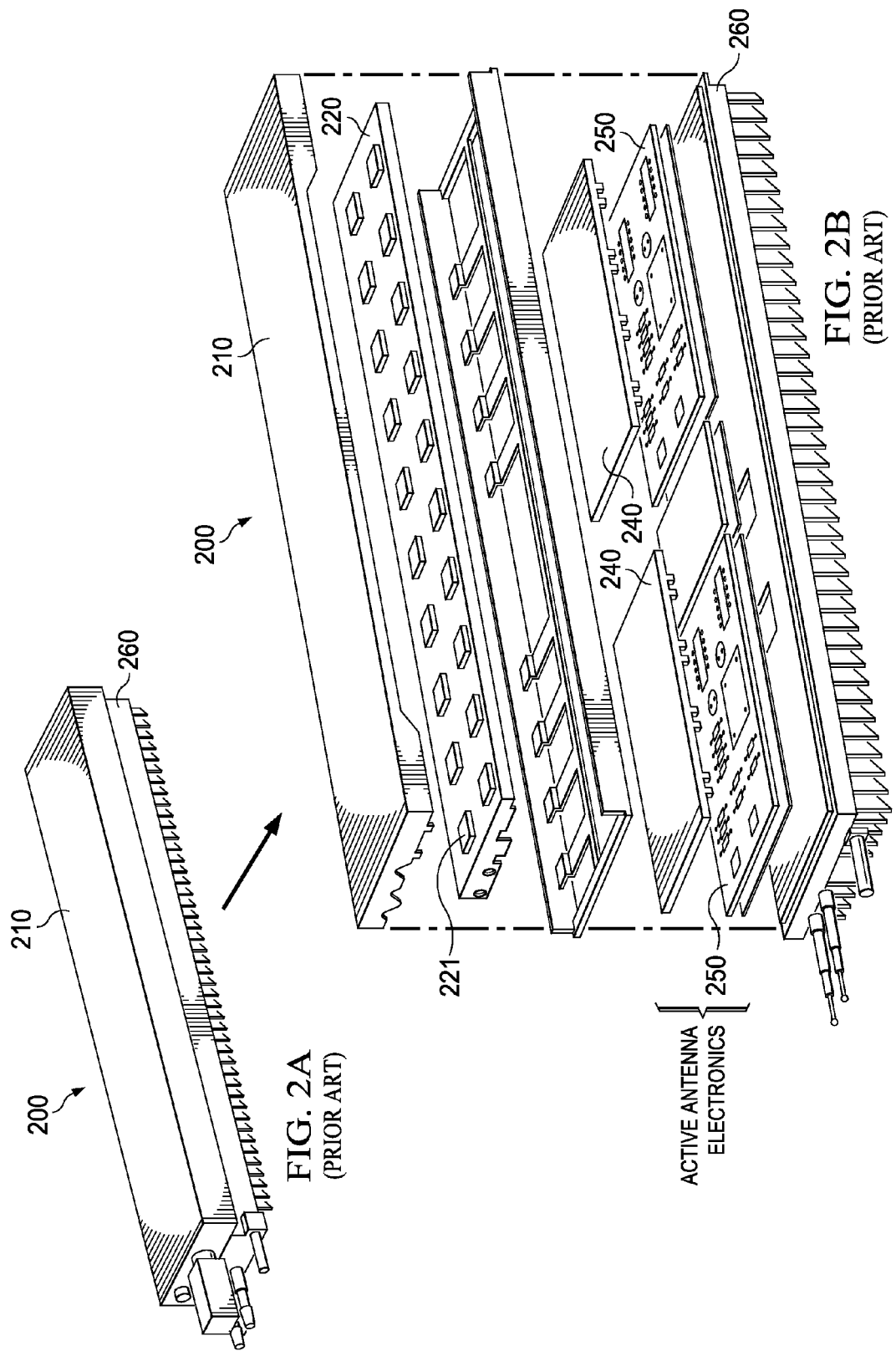
FIG. 2A illustrates a diagram of a conventional AAS.
FIG. 2B illustrates a diagram of internal components of the conventional AAS.

Hardwired calibration feedback paths are suitable for conventional non-modular AASs, as the hardwired calibration feedback path is sealed completely within the AAS enclosure such that the RF connection remains undisturbed throughout the life of the AAS. FIG. 2a-2b illustrates a conventional non-modular AAS 200, as may be common place in present day wireless access networks. As shown, the conventional non-modular AAS 200 includes a radome 210, a plurality of internal elements 220-250, and a lower base frame 260. The plurality of internal elements 220-250 may include antenna reflector 220, antenna elements 221, duplexers 240, an active circuit board 250, as well as other components. Notably, the radome 210 attaches to the lower base-frame 260 to form an air-tight cavity shielding the internal components 220-250 from environmental contaminates. The radome 210 is typically attached to the lower bas-frame 260 at the factory during manufacturing, and remains so affixed for the life of the AAS 200. The internal components 220-250 may include a hardwired RF feedback path, which provide calibration feedback to the transmit paths.

Figure 3:
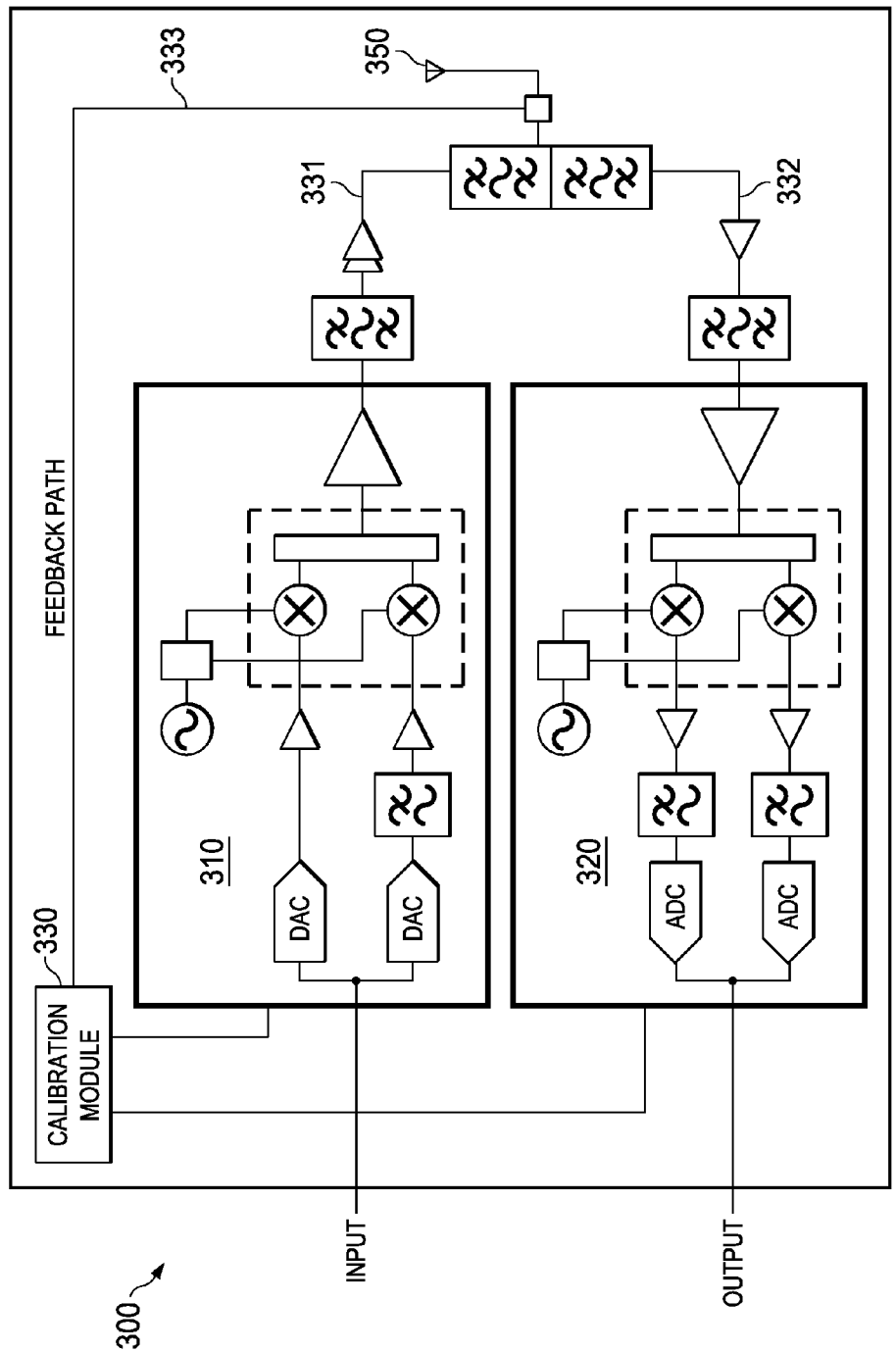
FIG. 3 illustrates a circuit diagram of a conventional calibration system for a non-modular AAS.

FIG. 3 illustrates a circuit diagram of a conventional transceiver 300 comprising a transmit circuit 310, a receive circuit 320, a calibration module 330, and a radiating element 350. As shown, the transmit circuit 310 is configured to transmit a wireless signal over the radiating element 350 via the transmit path 331, while the receive circuit 320 is configured to process a wireless signal received over the radiating element 350 via the receive path 332. The calibration module 330 is configured to continuously calibrate the transmit circuit 310 and the receive circuit 320 in accordance with feedback information obtained from the RF feedback path 333, which is a hard-wired connection coupled to the transmit/receive paths 331-332.

The calibration module 330 may analyze the feedback information obtained over the feedback path 353 in accordance with factory calibration settings, which may depend on, inter alia, physical characteristics (e.g., impedance, etc.) of the RF feedback path 333. The physical characteristics of the RF feedback path 333 may typically remain relatively static so long as the RF feedback path 333 remains undisturbed. However, the physical characteristics of the RF feedback path 333 may fluctuate if the RF feedback path 333 is distributed (e.g., broken and remade), which may fowl the factory calibration settings. Since disruption of the RF feedback path 353 may typically be a consequence of field-servicing, hard-wired RF feedback paths (such as the RF feedback path 333) may be unsuitable for modular AASs designed for the on-site installation of RF modules.

Figure 4:
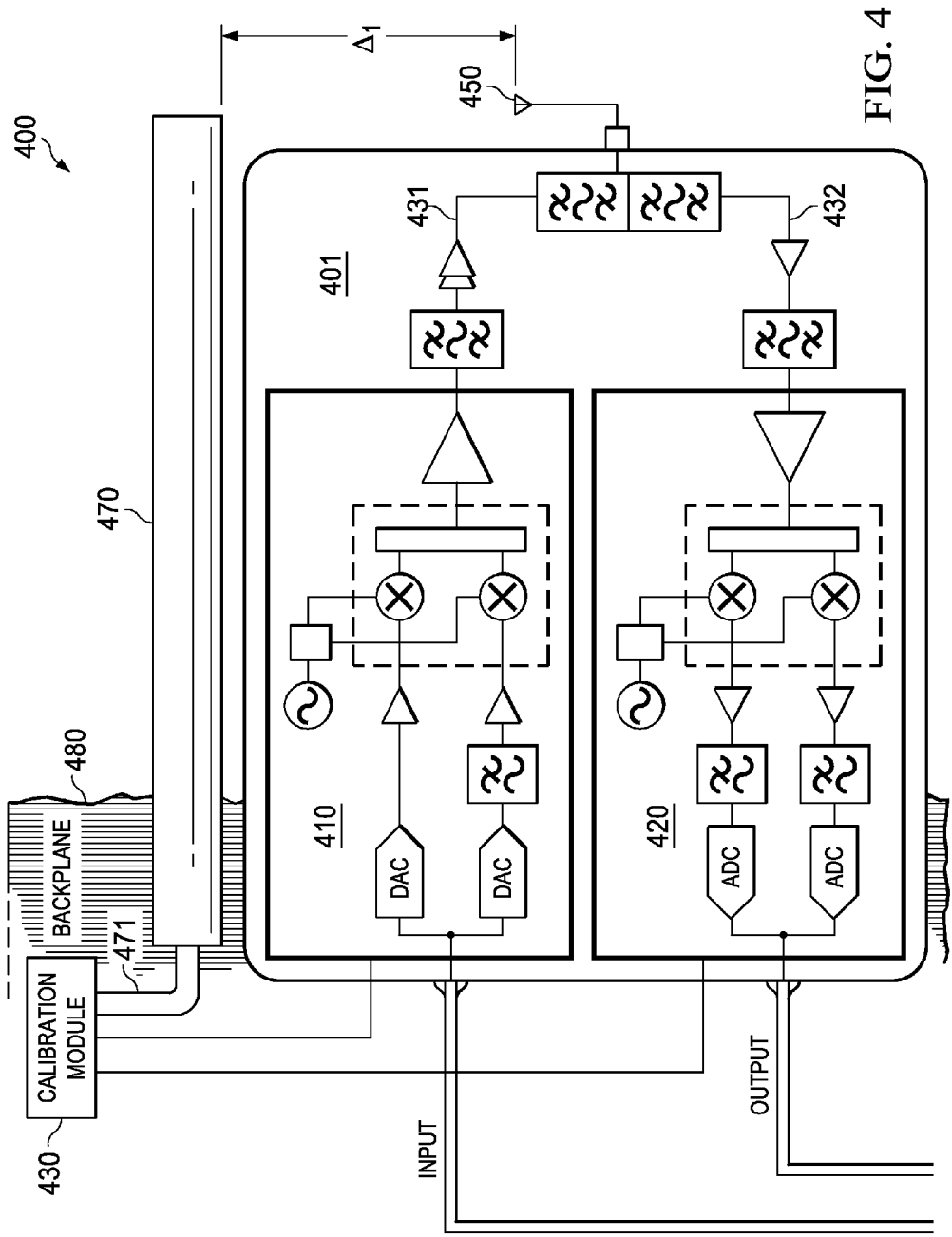
FIG. 4 illustrates a circuit diagram of an embodiment calibration system for a modular AAS.

Replacing hard-wired RF feedback paths with an external near-field RF probe may allow for the RF module to be field-serviced without fowling factory calibration settings. FIG. 4 illustrates an embodiment transceiver 400 comprising an RF module 401 and an external near-field RF probe 470 installed on a backplane 480. As shown, the RF module 401 comprises a transmit circuit 410, a receive circuit 420, and a radiating element 450, and may be configured to communicate wireless signals over transmit and receive paths 431-432. Further, the external near-field RF probe 470 is positioned in relatively close proximity to the radiating element 450, such that calibration signals may be wirelessly communicated between the near-field RF probe 470 and radiating element 450. In some embodiments, the backplane 480 may be configured such that a sensing end/portion of the external near-field RF probe 470 is positioned a fixed distance ($\Delta_1$) away from the radiating element 450 as a result of properly installing the RF module 401. This may be achieved through, for example, precise positioning of the mounting points for installing the RF module 401 on the backplane 480. Notably, the RF module 401 may be field/serviced (e.g., installed/de-installed) on the backplane 480 without breaking an RF connection 471 between the external near-field RF probe 470 and the calibration module 430.

Figure 5A:
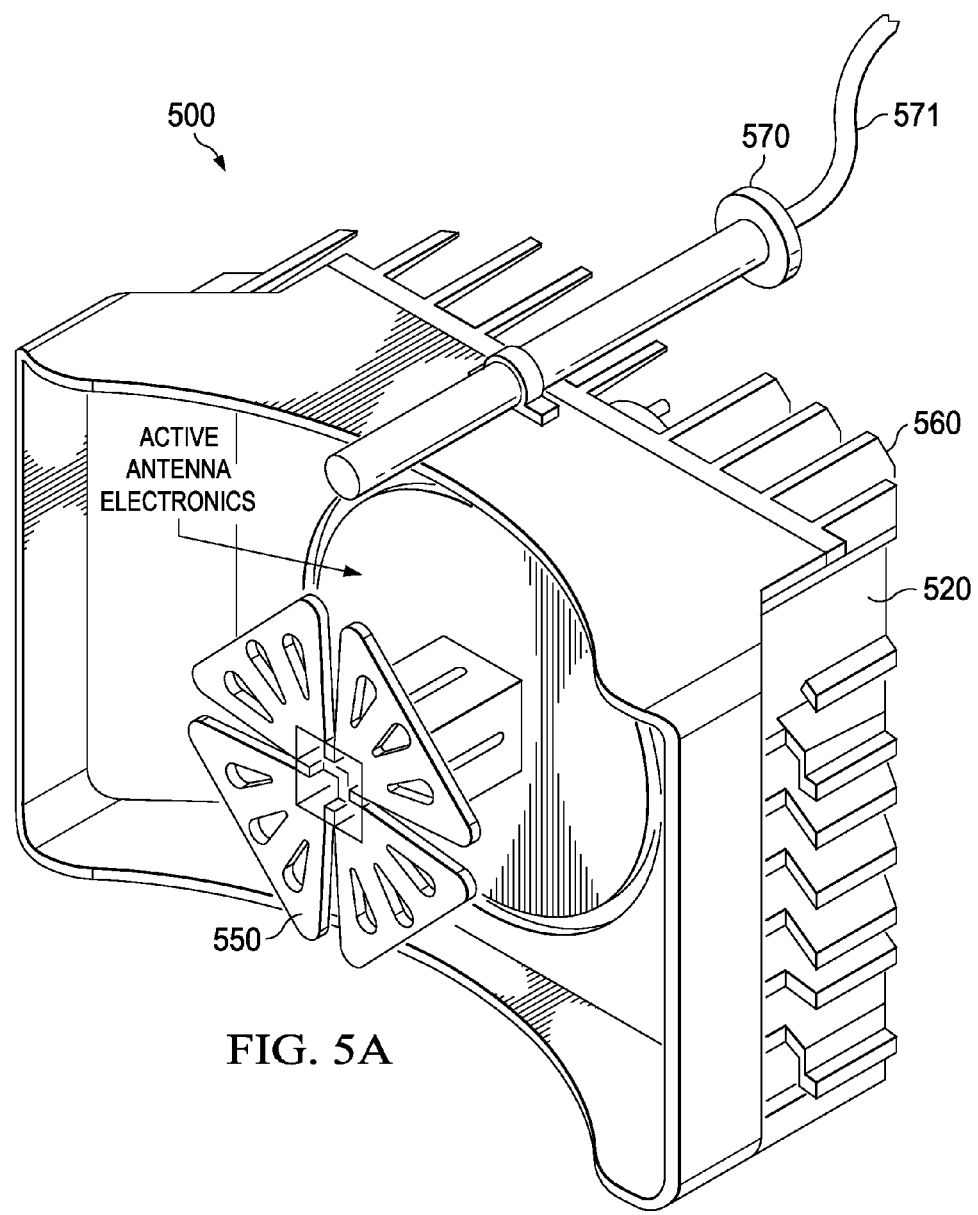
FIG. 5A illustrates a diagram of internal components of an embodiment RF module.
Figure 5B:
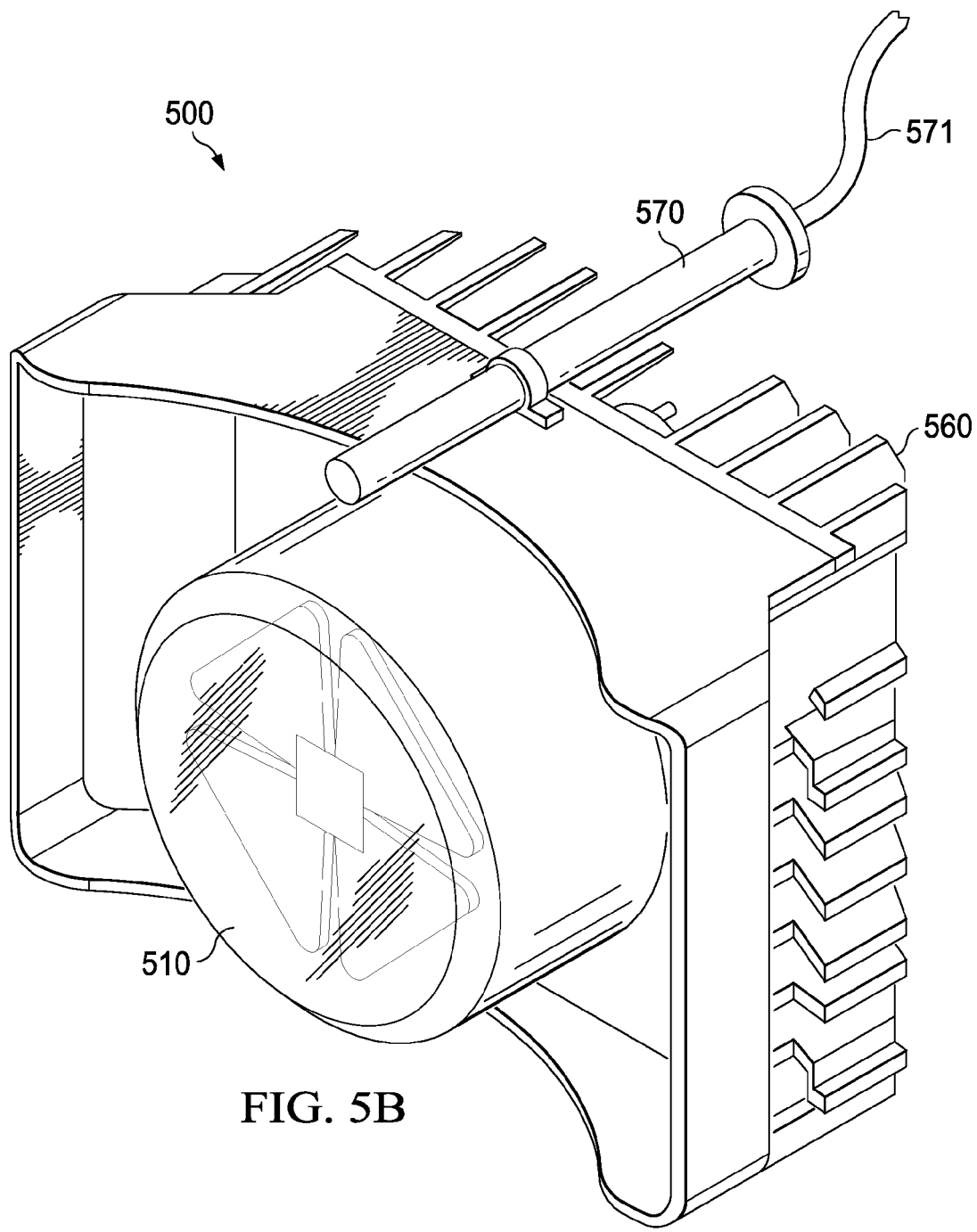
FIG. 5B illustrates a diagram of additional internal components of the embodiment RF module.
Figure 5C:
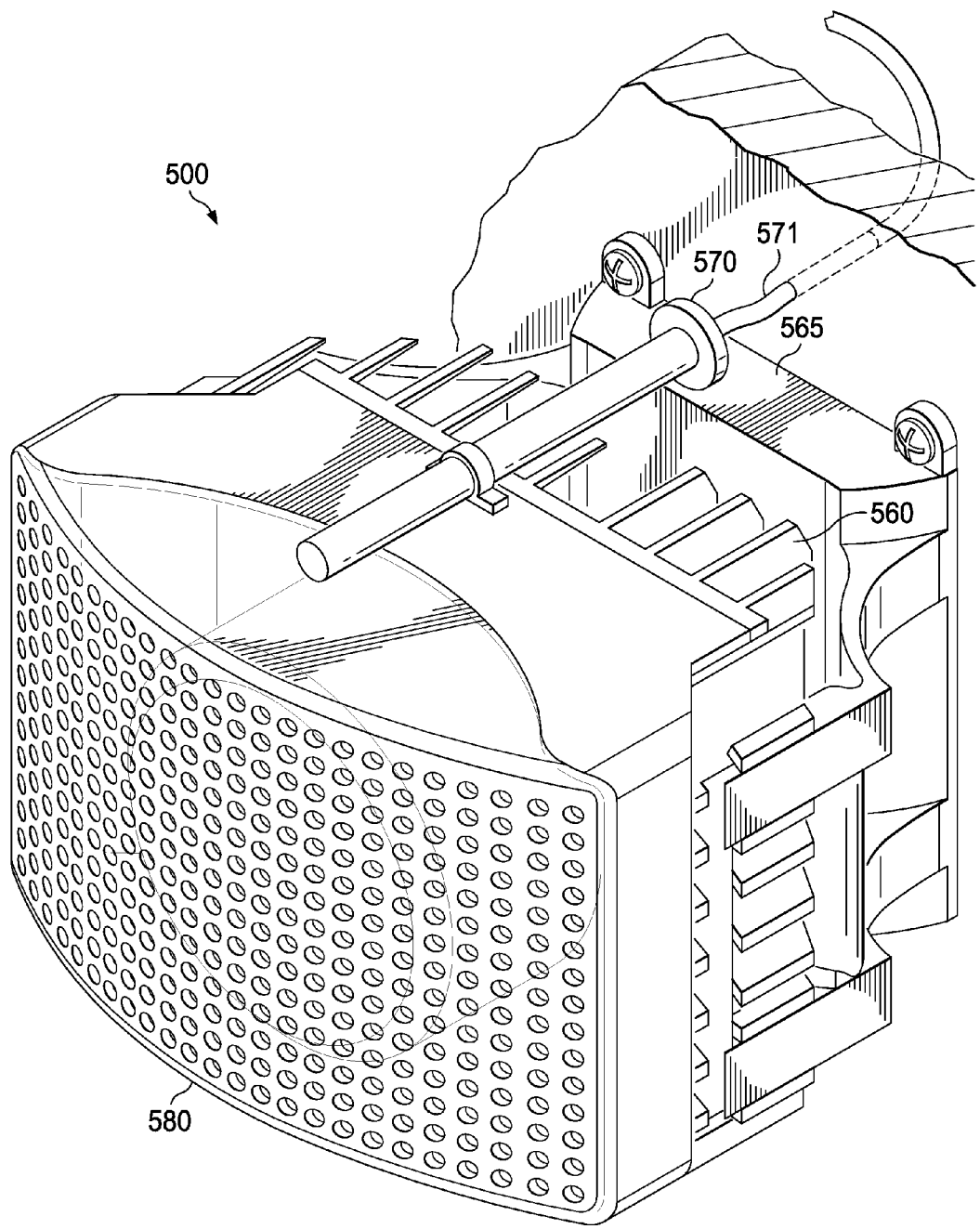
FIG. 5C illustrates a diagram of an assembled embodiment RF module configured for field installation.

FIGS. 5A-5C illustrate an embodiment RF module 500 configured with an external near-field RF probe 570. The RF module 500 may be configured similar to the RF module 400 such that the RF module 500 can be field-serviced without disrupting an RF connection 571 of the near-field RF probe 570. As shown in FIG. 5A, the external near-field RF probe 570 is provisionally anchored to the frame 560 of the RF module 500, which may allow the RF module 500 to be reliably installed such that a fixed/known distance separates the external near-field RF probe 570 from the radiating element 550. As shown, the external near-field RF probe 570 is positioned such that the tip protrudes slightly beyond the outer lip of the radome 510. However, the RF module 500 needn't necessarily extend beyond the outer lip of the radome 510, as the calibration system may remain operable even when the radome 510 is positioned directly between the near-field RF probe 570 and the radiating element 550, e.g., such that no portion of the near-field RF probe 570 protrudes beyond the outer lip of the radome 510. The RF module 500 may further include a radome 510 encasing the radiating element 550, as shown in FIG. 5B. Optionally, The RF module 500 may include an external cover 580 to provide structural protection to and/or enhance the aesthetic appeal of the RF module 500, as shown in FIG. 5C.

Figure 6A:
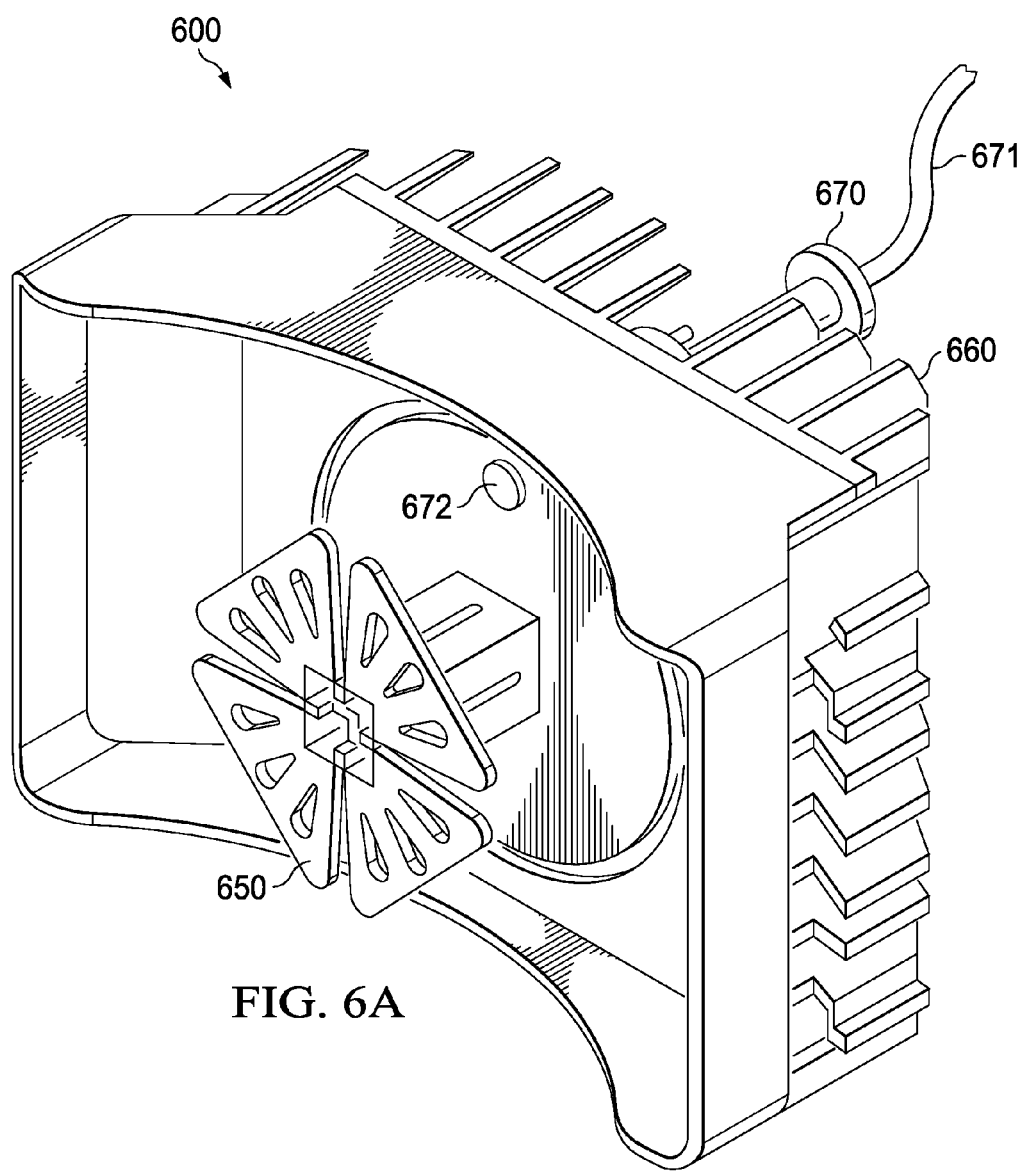
FIG. 6A illustrates a diagram of internal components of another embodiment RF module.
Figure 6B:
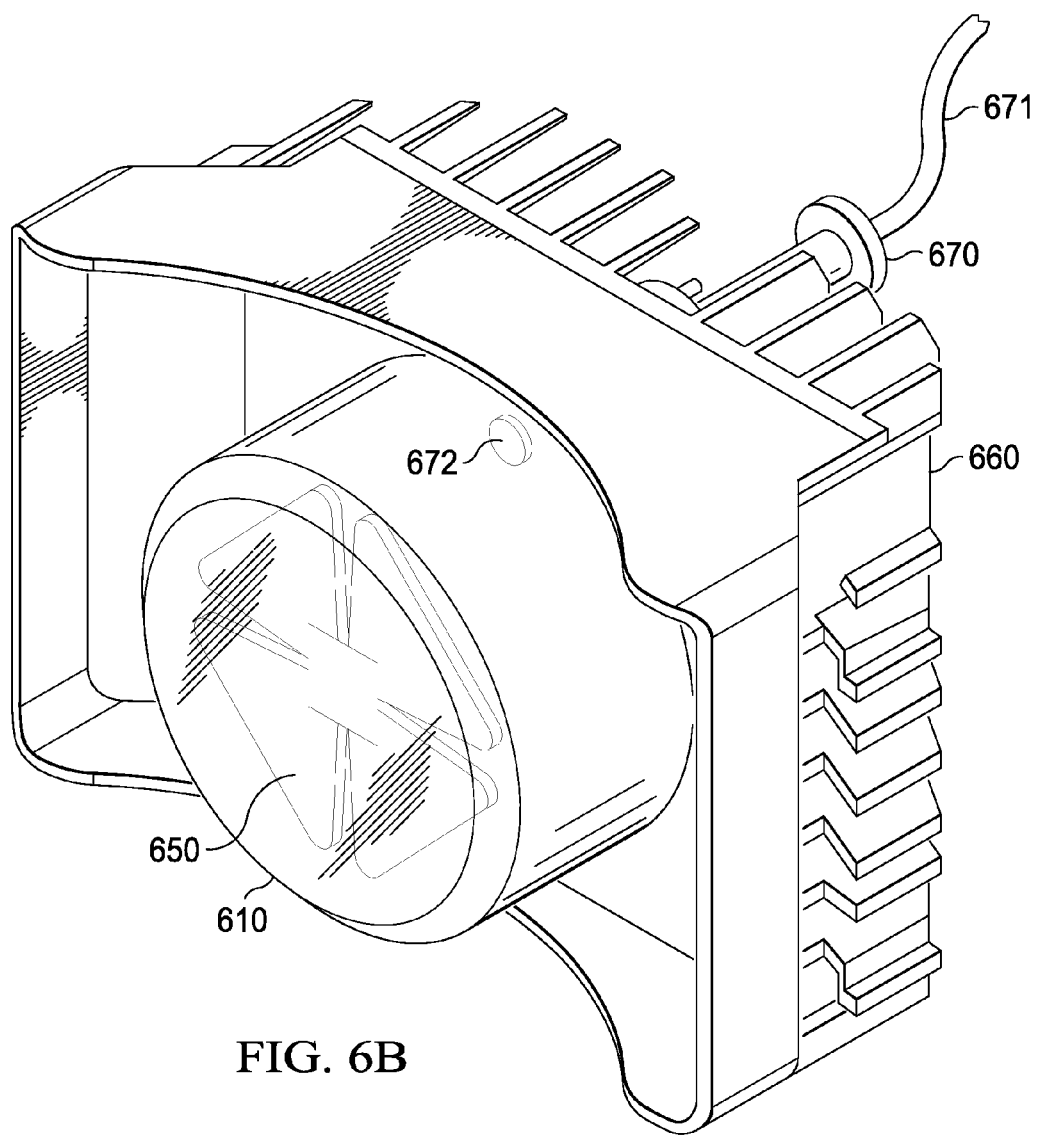
FIG. 6B illustrates a diagram of additional internal components of the other embodiment RF module.

External near-field RF probes can be positioned in a variety of locations, so long as the distance between the RF probe's sensor and the radiating element remains within an operable range. FIGS. 6A-B illustrate an embodiment RF module 600 configured with an external near-field RF probe 670. Like the RF modules 400 and 500, the embodiment RF module 600 can be field-serviced without disrupting an RF connection 671 of the near-field RF probe 670. As shown in FIG. 6A, a protruding end 672 of the external near-field RF probe 670 extends through a frame 660 of the RF probe. The RF module 500 may be configured with a radome 610 encasing the radiating element 650 as well as the protruding end 672 of the external near-field RF probe 670.

Figure 7:
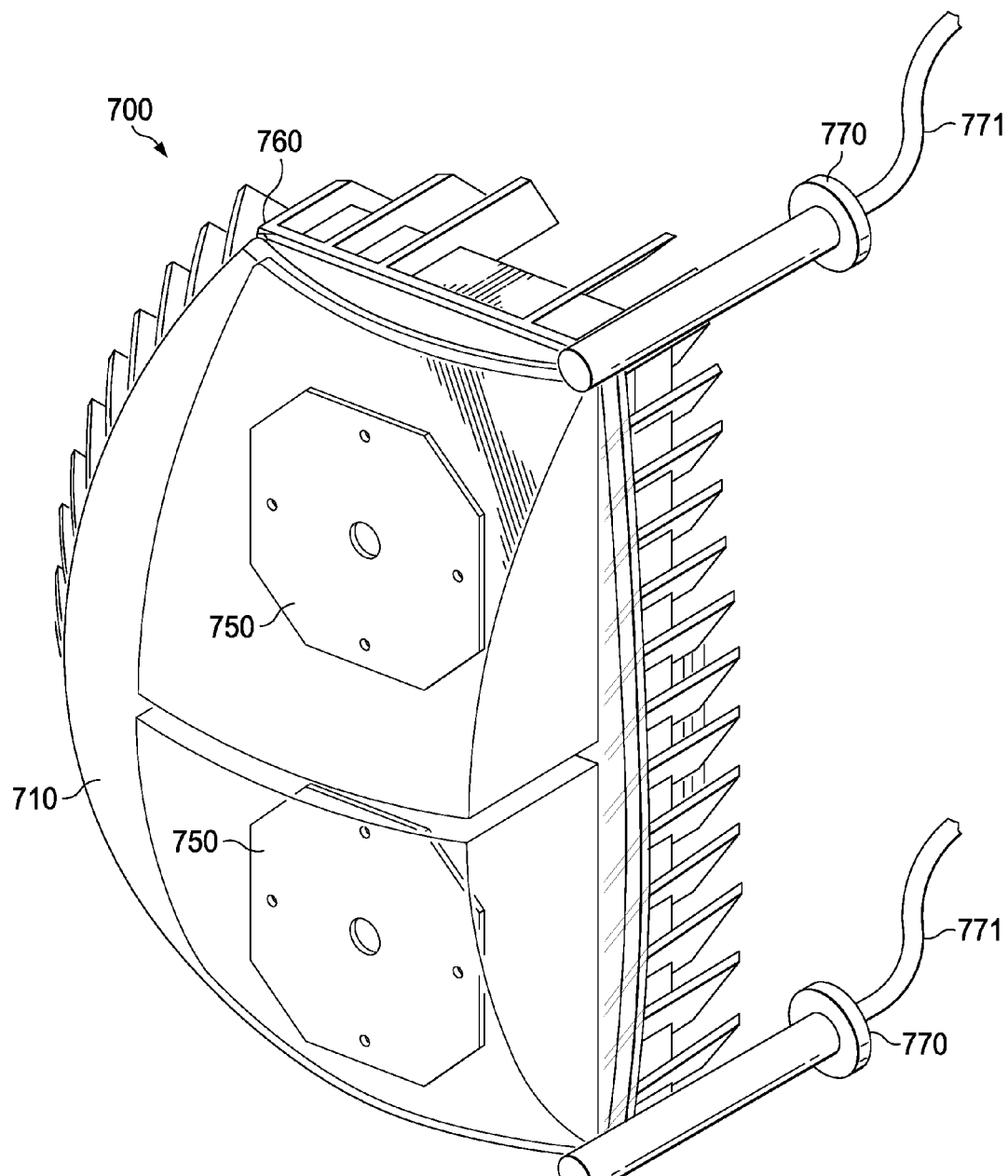
FIG. 7 illustrates a diagram of yet another embodiment RF module.

Near-field RF probe placement may be influenced by RF module design considerations. FIG. 7 illustrates an RF module 700 configured with a pair of external near-field RF probes 770 for providing calibration readings for a pair of radiating elements 750. Like the RF modules 400, 500, and 600, the embodiment RF module 700 can be field-serviced without disrupting RF connections 771 of the near-field RF probes 770. As shown, the external near-field RF probes 770 are positioned outside the radome 710, which may allow for easier and/or more reliable field installation.

Figure 8:
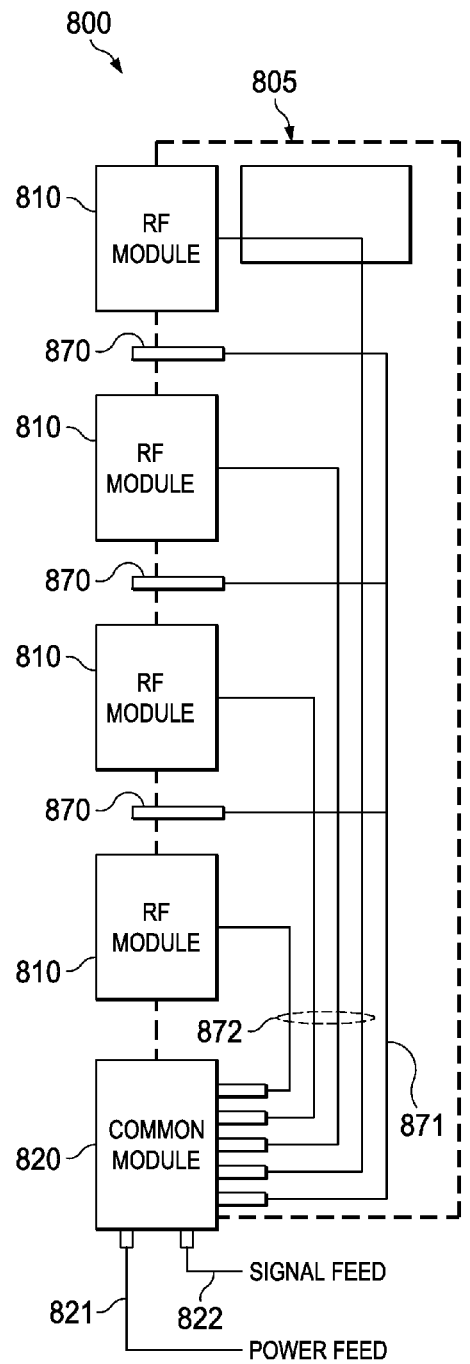
FIG. 8 illustrates a high-level diagram of an embodiment modular AAS configured with near-field RF probes.
Figure 9:
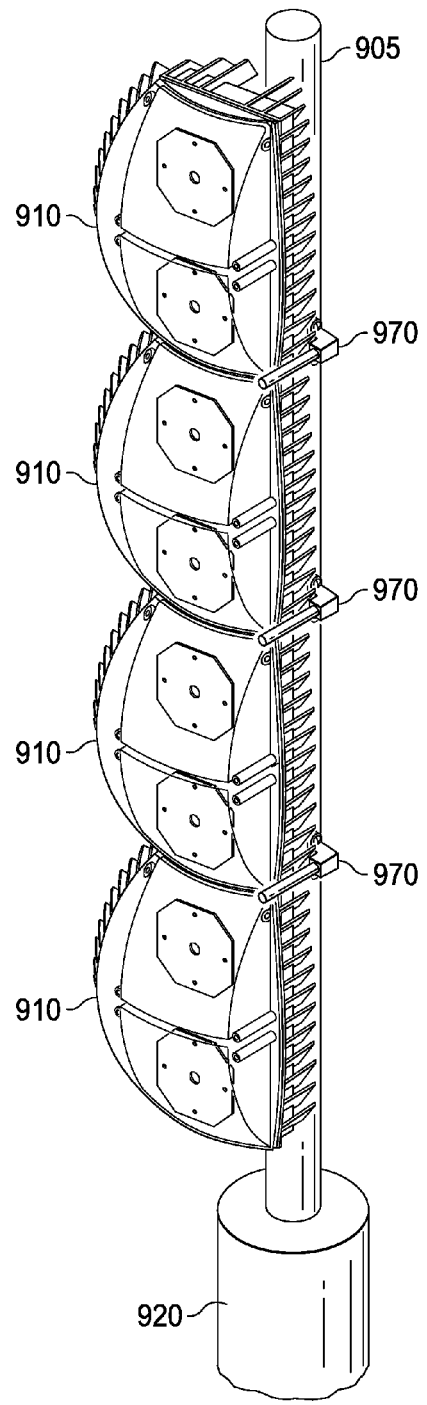
FIG. 9 illustrates a diagram of an embodiment modular AAS installation.

Near-field RF probe placement may also be influenced by modular AAS design considerations. For instance, near-field RF probes may be positioned such that one probe monitors multiple transmit and/or receive paths, or such that each transmit and/or receive path is monitored by multiple RF probes. Additionally, near-field RF probes may be positioned such that fewer external near-field RF probes are needed to monitor an array of RF modules. FIG. 8 illustrates a high-level diagram of an embodiment modular AAS 800 that includes a plurality of RF modules 810 and a plurality of external near-field RF probes 870 mounted to a backplane 805. As shown, the near-field RF probes are positioned between the RF modules 870, thereby allowing each of the external near-field RF probe 870 to monitor multiple transmit and/or receive paths. The modular AAS 800 may also include a common module 820, which may provide calibration and/or other processing functions for the RF module 810. The common module 820 may also provide power distribution via the power feed 821, as well as signal distribution via the signal feed 822. FIG. 9 illustrates an embodiment modular AASs 900 that includes a plurality of RF modules 910, a plurality of external near-field RF probes 970, and a common module 920 mounted to a backplane 905. Notably, the modular AASs 900 may be field-serviced by removing the RF modules 910 from the backplane 905 without fowling the factory calibration of the RF connections, which extend from the external near-field RF probes 970 to the common module 920 through the interior of the backplane 905.

Figure 10:
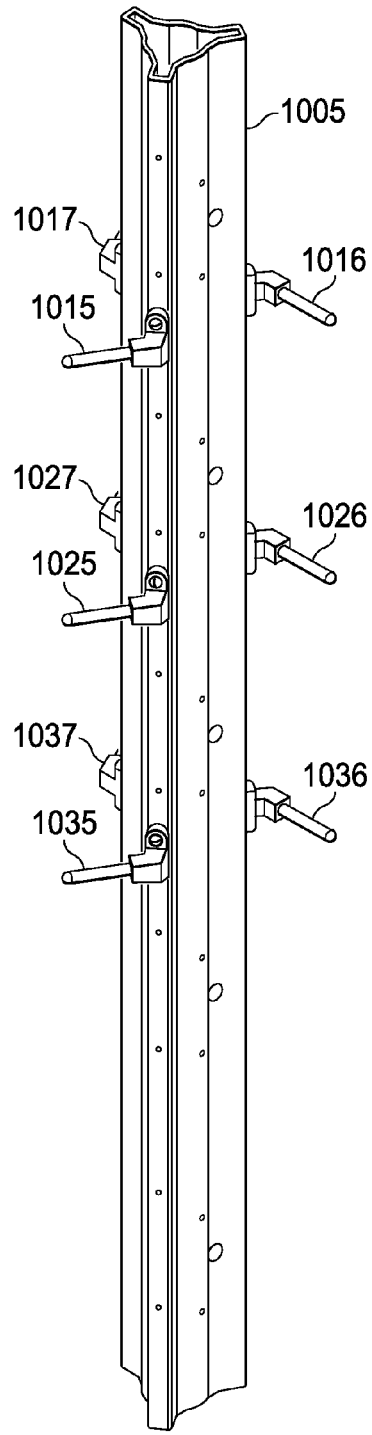
FIG. 10 illustrates a diagram of an embodiment backplane.
Figure 11:
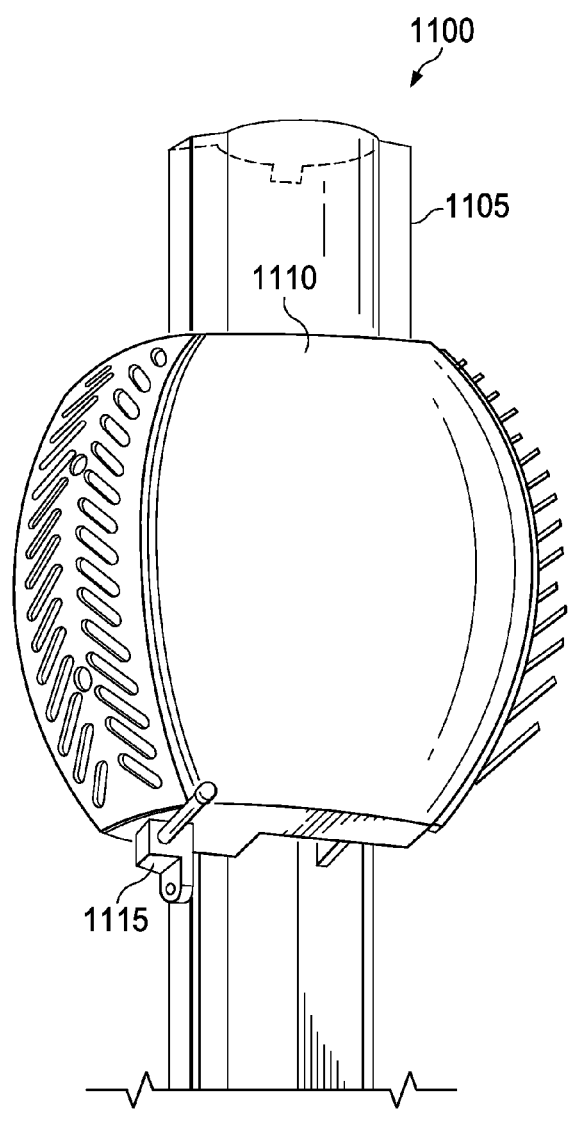
FIG. 11 illustrates a diagram of a mounting configuration.
Figure 12:
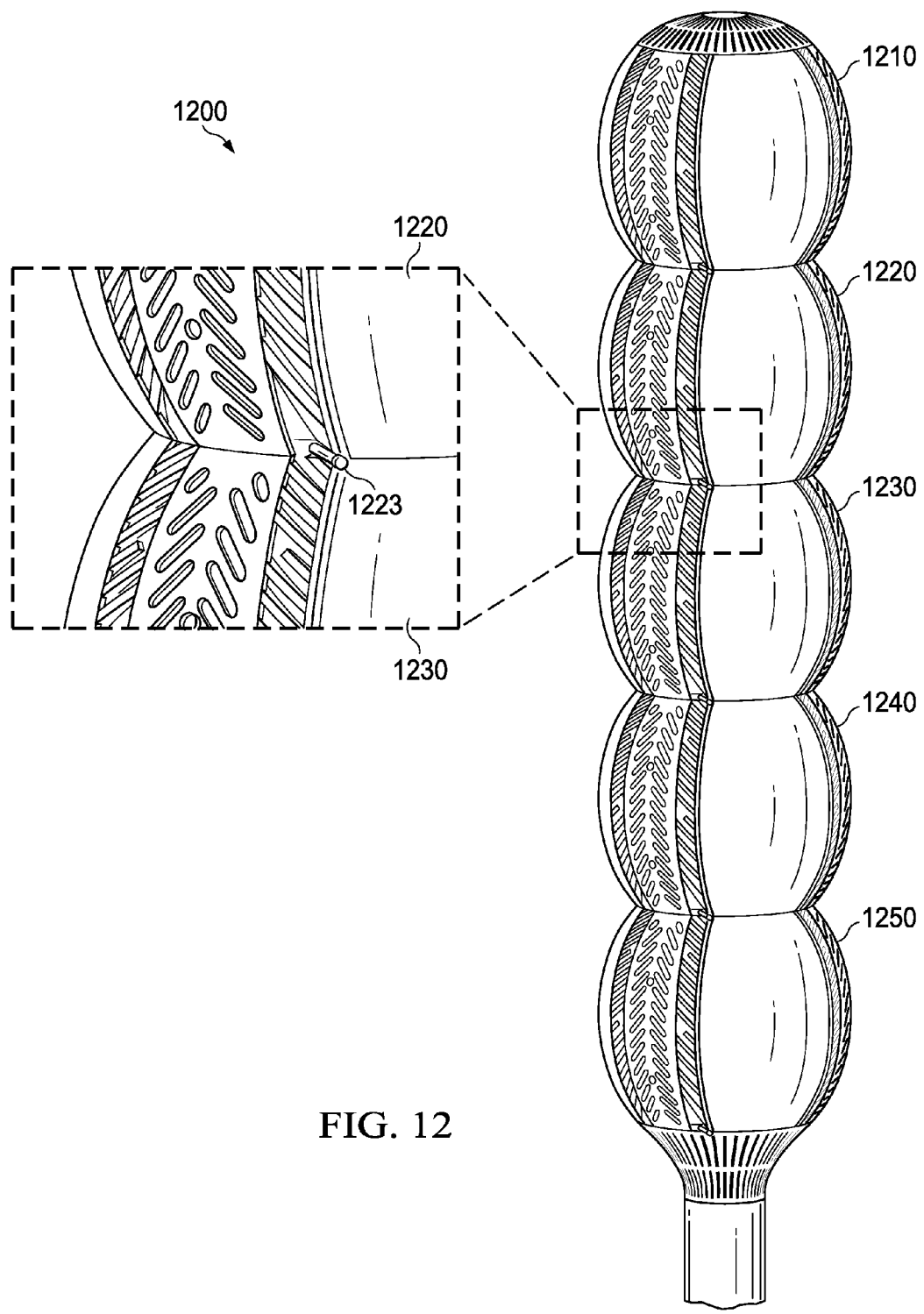
FIG. 12 illustrates a diagram of another embodiment modular AAS installation.

In some embodiments, external near-field RF probes may be positioned to facilitate specific RF module arrangements. For instance, RF modules may be arranged in multi-sector AAS configuration to provide wider beam coverage (e.g., up to 360 degrees). FIG. 10 illustrates an embodiment backplane 1005 upon which a plurality of RF probes 1017-1037 are positioned to achieve a multi-sector antenna array. In some implementations, the external near-field RF probes 1017-1037 may be mounted to the backplane 1005 at the factory, while the RF modules may be mounted to (or installed on) the backplane in the field. FIG. 11 illustrates a mounting configuration 1100 depicting an RF module 1110 being installed on a backplane 1105. As shown, the RF module 1110 can be serviced (e.g., mounted, de-mounted, etc.) without disturbing an RF connection of the external near-field RF probe 1115. FIG. 12 illustrates an AAS module 1200 comprising a plurality of multi-sector RF module clusters 1210-1250. As can be seen, the external near-field RF probe 1223 is positioned unobtrusively between the multi-sector RF module clusters 1220 and 1230, thereby providing reliable calibration without interfering with the field serviceability of the AAS module 1200.

Figure 13:
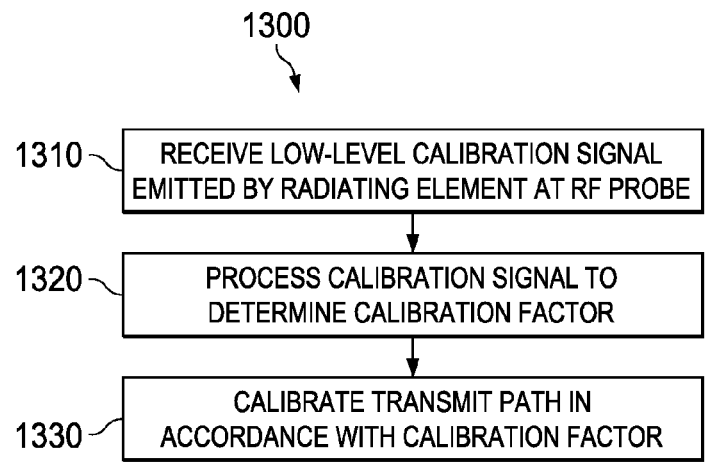
FIG. 13 illustrates a flowchart of an embodiment method for calibrating a transmit path.

External near-field RF probes may provide transmitter path calibration by receiving (or otherwise picking up) calibration signals emitted by the RF module's radiating element. FIG. 13 illustrates a method 1300 for calibrating a transmit path, as might be performed by a calibration system. The method 1300 begins at step 1310, where a low-level calibration signal emitted by a radiating element at the RF probe. Next, the method 1300 proceeds to step 1320, where the calibration system processes the low-level calibration signal to determine a calibration factor. Thereafter, the method 1300 proceeds to step 1330, where the calibration system calibrates the transmit path in accordance with the calibration factor determined in step 1320.

Figure 14:
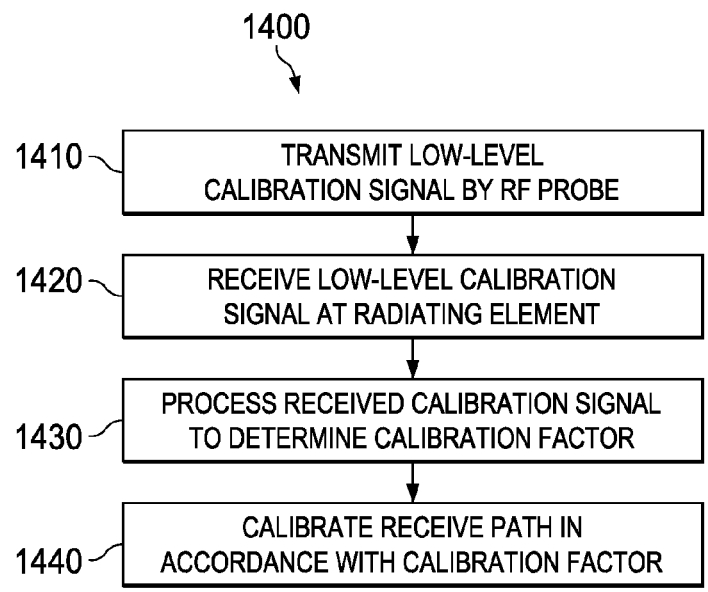
FIG. 14 illustrates a flowchart of an embodiment method for calibrating a receive path.

External near-field RF probes may provide receiver path calibration by transmitting calibration signals to the RF module's receiver/radiating-element. FIG. 14 illustrates a method 1400 for calibrating a receive path, as might be performed by an AAS. The method 1400 begins at step 1410, where a low-level calibration signal is transmitted by the RF probe. Next, the method 1400 proceeds to step 1420, where the low-level calibration signal is received by the radiating element. Thereafter, the method 1400 proceeds to step 1430, where the calibration system processes the low-level calibration signal to determine a calibration factor. Finally, the method 1400 proceeds to step 1440, where the calibration system calibrates the receive path in accordance with the calibration factor determined in step 1430.

An embodiment modular active antenna system (AAS) includes an active antenna module having antenna elements, and an external near-field RF probe configured to pick up calibration signals from and radiate calibration signals to the antenna elements in the active antenna module. In a further embodiment, the modular AAS includes a plurality of active antenna modules, a plurality of external near-field probes, and a mounting apparatus holding the plurality of active antenna modules and near-field probes, and having a fixed distribution network for the plurality of near-field probes. In a further embodiment, the plurality of active antenna modules are configured to be dismounted and mounted to the mounting apparatus without physically disturbing the plurality of near-field probes and the fixed distribution network. In another embodiment, an AAS comprises a calibration probe network.

An embodiment method of operating a modular AAS having a calibration probe network includes detecting a calibration signal in Tx and Rx paths of an active antenna module, and correlating the calibration signal in the Tx and Rx paths to determine calibration factors for the Tx and Rx paths. In attempting to employ a modular architecture to make an AAS with field serviceable modules, calibration becomes a major challenge, because any field service can change the calibration network characteristics and even invalidate the factory calibration.

A modular AAS system includes multiple independent modules that work together as an active antenna system. Each module contains one or more antenna elements and one or more transceivers. The modules can be serviced individually. Due to manufacturing inaccuracy, parts variation and limitation of the active electronics, signals transmitted or received by individual modules may not be aligned in amplitude and phase. To ensure the proper beam forming effect, the array element modules are calibrated.

An embodiment modular AAS uses an external RF probe that is not integrated within the RF module to allow the calibration network to maintain its accuracy through servicing or replacement of individual RF modules. An embodiment simplifies the design of the RF modules, and provides calibration of the modular active antenna array. An embodiment provides AAS products that are modular, easier to field service, and lower in cost. Embodiments may be applied to mobile broadband infrastructure systems. An embodiment decouples the RF feedback path from the module and keeps the RF feedback path intact during the replacement of the individual RF modules.

Embodiment systems implement a calibration scheme using the near-field RF probes. One or more RF probes are located in the near field of the antenna elements. The probes pick up the transmit signals radiated by the nearby antenna elements and radiate low level calibration signals into the receivers through the nearby antenna elements without impacting the normal operation of the antenna array.

A mounting apparatus accommodates the probes, the individual modules and an RF distribution/combining network that transports calibration signals to and from the array elements to the calibration transceivers. The calibration network is independent of the array elements and calibrated in the factory. The factory calibration validity is not compromised by replacement of the individual array elements. The design of the array element module and the mounting apparatus allows the modules to be replaced without physically moving the calibration probes. An embodiment enables a field serviceable modular AAS product that maintains its performance after field services. In some embodiments, a common module injects and receives a calibration signal that is then processed to determine the calibration correction factors. An embodiment method injects and receives the calibration signal in a manner so as to determine the per-path calibration corrections.

In some embodiments, the calibration network may be decoupled from the individual modules that make up the active antenna system. Therefore, the servicing or replacement of an individual module does not degrade the factory calibration of the calibration network, allowing the performance of the AAS to be maintained throughout its service period.

The capability to field service individual modules of the AAS generally provides advantages over integrated AASs or traditional RRU+antenna architectures.

Figure 15:
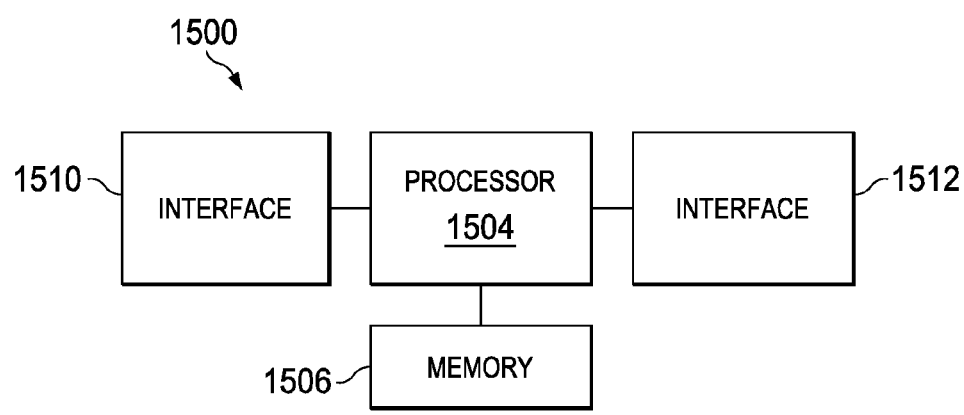
FIG. 15 illustrates a block diagram of an embodiment communications device.

The near-field probe calibration reduces the complexity of the calibration scheme because only a single calibration Tx/Rx function can be built within the common module, and not in each RF module. Further, additional RF traces, couplers or connectors on each RF module generally FIG. 15 illustrates a block diagram of an embodiment of a device 1500, which may be equivalent to one or more devices (e.g., a common module, a calibration module, etc.) discussed above. The device 1500 may include a processor 1504, a memory 1506, a plurality of RF interfaces 1510, and one or more control interfaces 1512, which may (or may not) be arranged as shown in FIG. 15. The processor 1504 may be any component capable of performing computations and/or other processing related tasks, and the memory 1506 may be any component capable of storing programming and/or instructions for the processor 1504. The RF interfaces 1510 may be any component or collection of components that allow the device 1500 to receive and/or transmit RF signals. For instance, the RF interfaces 1510 may be used to communicate low-level calibration signals to an antenna or radiating element. The control interfaces 1512 may be any component or collection of components that allows the device 1500 to communicate control information to other devices. For instance, the control interfaces 1512 may be used to manipulate calibration factors in RF modules.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An active antenna device comprising:
a path;
a radiating element that radiates a wireless signal; and
a near-field radio frequency (RF) probe positioned adjacent to the radiating element such that the near-field RF probe does not obstruct a main lobe of the wireless signal radiated from the radiating element, the near-field RF probe configured to wirelessly communicate a calibration signal with the radiating element during field operation of the active antenna device, wherein the calibration signal is processed to calibrate a phase or gain parameter of the path, and wherein a distance between the near-field RF probe and the radiating element is less than one wavelength of the wireless signal radiated from the radiating element.

2. The active antenna device of claim 1, wherein the near-field RF probe is configured to transmit the calibration signal to the radiating element, and wherein the path is a receive path over which the calibration signal is configured to be forwarded upon being detected by the radiating element.

3. The active antenna device of claim 1, wherein the radiating element is configured to transmit the calibration signal to the near-field RF probe, and wherein the path is a transmit path over which the calibration signal is configured to be propagated prior to being transmitted by the radiating element.

4. A structure for antenna devices comprising:
a backplane structure;
a radio frequency (RF) module mounted to the backplane structure, the RF module including a radiating element that radiates a wireless signal; and
a near-field RF probe affixed to the backplane structure, the near-field RF probe positioned adjacent to the radiating element of the RF module such that the near-field RF probe does not obstruct a main lobe of the wireless signal radiated from the radiating element, wherein the near-field RF probe is configured to communicate a calibration signal with the radiating element of the RF module during field operation of the RF module, and wherein a distance between the near-field RF probe and the radiating element of the RF module is less than one wavelength of the wireless signal radiated from the radiating element of the RF module.

5. The structure of claim 4 further comprising a calibration module configured to process calibration signals communicated between multiple near-field RF probes and radiating elements of multiple RF modules mounted to the backplane structure.

6. The structure of claim 5, wherein the calibration module is configured to obtain a calibration factor as a result of processing the calibration signals communicated between the multiple near-field RF probes and the radiating elements of the multiple RF modules mounted to the backplane structure.

7. The structure of claim 6, wherein the calibration module is configured to calibrate transmit paths of the multiple RF modules in accordance with the calibration factor.

8. The structure of claim 6, wherein the calibration module is configured to calibrate receive paths of the multiple RF modules in accordance with the calibration factor.

9. The structure of claim 6, wherein the calibration module is configured to align phase or gain parameters of the multiple RF modules in accordance with the calibration factor.

10. A modular active antenna system (AAS) comprising:
a backplane;
an array of independent radio frequency (RF) modules mounted to the backplane, the array of independent RF modules including at least a first RF module comprising a radiating element that radiate a wireless signal;
a calibration module; and
a plurality of near-field RF probes coupled to the calibration module via a plurality of RF connections, the plurality of near-field RF probes including a first near-field RF probe that communicates a calibration signal with the radiating element of the first RF module during field operation of the first RF module, the first near-field RF probe being positioned adjacent to the radiating element of the first RF module such that the first near-field RF probe does not obstruct a main lobe of the wireless signal radiated from the radiating element of the first RF module, wherein a distance between the first near-field RF probe and the radiating element of the first RF module is less than one wavelength of the wireless signal radiated from the radiating element of the first RF module.

11. The modular AAS of claim 10, wherein the calibration module is configured to process calibration signals to align phase or gain parameters of the array independent RF modules.

12. The modular AAS of claim 10, wherein multiple independent RF modules in the array of independent RF modules are configured to communicate calibration signals with a common one of the plurality of near-field RF probes.

13. The modular AAS of claim 12, wherein the modular AAS includes a greater number of independent RF modules than near-field RF probes.

14. The modular AAS of claim 10, wherein a common one of the plurality of near-field RF probes is configured to receive calibration signals from multiple transmit paths in the array of independent RF modules.

15. The modular AAS of claim 14, wherein the modular AAS includes a greater number of transmit paths than near-field RF probes.

16. The modular AAS of claim 10, wherein multiple receive paths in the array of independent RF modules are configured to receive calibration signals from a common one of the plurality of near-field RF probes.

17. The modular AAS of claim 16, wherein the modular AAS includes a greater number of receive paths than near-field RF probes.

18. The modular AAS of claim 10, wherein multiple near-field RF probes in the plurality of near-field RF probes are configured to communicate a calibration with a single independent RF module in the array of independent RF modules.

19. The modular AAS of claim 10, wherein the plurality of near-field RF probes are affixed to the backplane such that field-serving independent RF modules within the array of independent RF modules does not disturb the RF connections coupling the plurality of near-field RF probes to the calibration module.

* * * * *